United States Patent [19]

Kolodny et al.

[11] Patent Number: 4,677,658

[45] Date of Patent: Jun. 30, 1987

[54] REMOTE DICTATING APPARATUS

[76] Inventors: Gerald M. Kolodny, 124 Dartmouth St., West Newton, Mass. 02165; Howard I. Cohen, 39 Judith La., Waltham, Mass. 02154

[21] Appl. No.: 788,666

[22] Filed: Oct. 17, 1985

Related U.S. Application Data

[63] Continuation of Ser. No. 473,667, Mar. 9, 1983, abandoned.

[51] Int. Cl.[4] .................. G11B 19/16; H04M 1/64
[52] U.S. Cl. .................................. 379/75; 379/77; 369/25; 369/29
[58] Field of Search .............. 179/6.09, 6.11, 2 A; 369/24, 25, 29; 360/61, 62; 381/123; 379/74, 75, 77, 102

[56] References Cited

U.S. PATENT DOCUMENTS

| | | | |
|---|---|---|---|
| 3,549,821 | 12/1970 | Langendorf | 179/6.09 |
| 3,691,300 | 9/1972 | Langendorf | 179/6.09 |
| 3,872,263 | 3/1975 | Wilder | 369/25 |
| 3,984,644 | 10/1976 | Matz | 369/29 |
| 4,004,276 | 1/1977 | Robinson | 179/6.11 |
| 4,049,915 | 9/1977 | Danner | 179/6.17 |
| 4,121,060 | 10/1978 | Bohnhoff | 369/29 |

Primary Examiner—Alan Faber
Attorney, Agent, or Firm—I. Stephen Samuels

[57] ABSTRACT

A dictating apparatus for a remotely controlled central record/playback system, the dictating apparatus being connected to the record/playback system via a telephone network. The dictating apparatus has a handset with a plurality of motion control and function buttons which, when depressed, cause transmission of selected tone bursts for controlling the operation of the record/plyback system. The buttons are positioned on the handset to permit a one-hand dictating operation.

10 Claims, 4 Drawing Figures

REMOTE DICTATING APPARATUS

This is a continuation of application Ser. No. 473,667, filed Mar. 9, 1983, now abandoned.

BACKGROUND OF THE INVENTION

1. Field of the Invention

The present invention relates to dictation systems and, more particularly, is directed toward a dictating apparatus for use in dictation systems using a telephone communication network to interconnect a plurality of dictating apparatuses at remote locations with a record/playback station at a central location.

2. Description of the Prior Art

Considerable effort has been made in the past to develop tone operated and voice actuated (VOX) apparatuses for remote dictating systems having a plurality of dictating units and a central record/playback station. In a tone operated apparatus, distinctive audio tones are transmitted through a pair of audio signal lines from a telephone to a record/playback system. These audio tones control operation of the record/playback system and the transmission of input and output audio signals. Generally, tone actuated apparatus utilize dual tone multiple frequency DTMF tones, the same tones that are used in telephone instruments. The DTMF keypad on a telephone instrument has twelve buttons or keys not all of which are used in tone operated record/playback systems. Most users are not able to depress the correct button without looking at the keypad. Therefore, such users must direct their attention to the keypad buttons rather than to the object which they may be studying while recording or playing back a previously recorded message. In addition, the operator must hold the handset in one hand and use the other hand to press the proper key on the keypad. A tone controlled dictation apparatus is shown in U.S. Pat. No. 3,691,300.

Dictation systems using voice actuated techniques were introduced in an attempt to overcome the disadvantages of making the operator look at the keys in the telephone keypad in order to operate the system. In the voice actuated technique, the presence of audio signals on the transmission wires are detected by detection circuits at the record/playback system. Tone control signals may be used in conjunction with voice actuated audio signal detection for controlling playback, rewind and forward functions. With this combination, the operator can record speech without having to be concerned about depressing the keys during dictation, but he must still use the keypad for generating control functions. A major disadvantage of the voice actuated system is its inability to work effectively over widely varying ambient room noise conditions and voice attenuation characteristics of the public telephone lines. In an environment with background noise, for example machines or people talking, the voice actuated circuit may interprete background noise as dictated audio signals and enter into a record mode. If the threshold sensitivity of the voice actuated circuit is increased to avoid false triggering on background noise, it is possible that low level dictation may not activate the circuit. This problem is compounded by the attenuation characteristics of telephone networks.

SUMMARY OF THE INVENTION

It is an object of the present invention to provide a dictating apparatus for a remotely controlled record/playback system.

It is another object of the present invention to provide a dictating apparatus at a remote location for remote control of a record/playback system at a central location, the dictating apparatus being connected to the record/playback system via a telephone network. The dictating apparatus is characterized by a handset having a plurality of motion control and function key switches which, when depressed, cause transmission of selected tone bursts on the telephone network. A tone detector at the central record/playback system controls selected functions and operations of a record/playback unit at the central location. The tone detector generates command signals in response to the particular tone burst generated from the control key switches in the handset.

Other objects of the present invention will in part be obvious and will in part appear hereinafter.

The invention accordingly comprises the apparatus and system, together with their parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
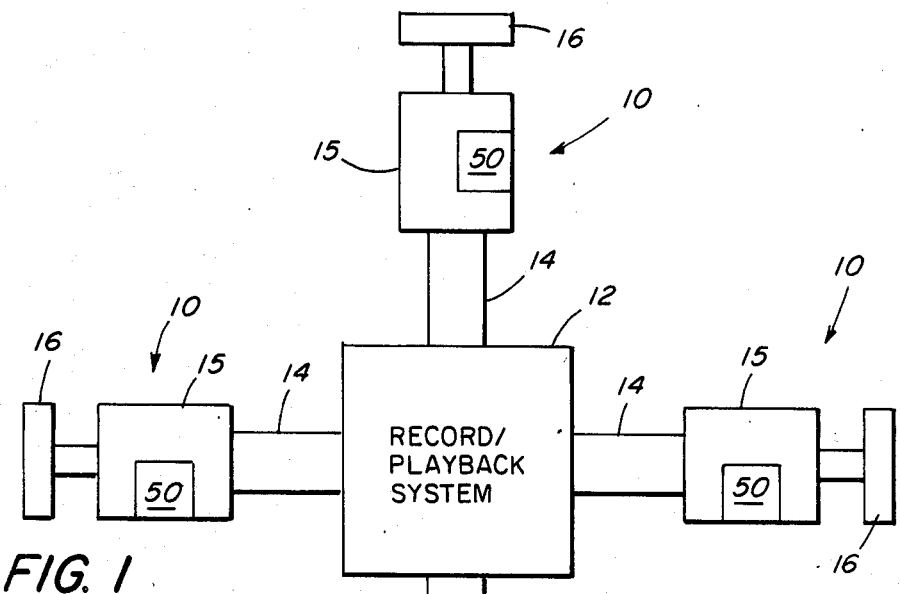
FIG. 1 is a block diagram of dictating apparatus embodying the present invention.
Figure 2:
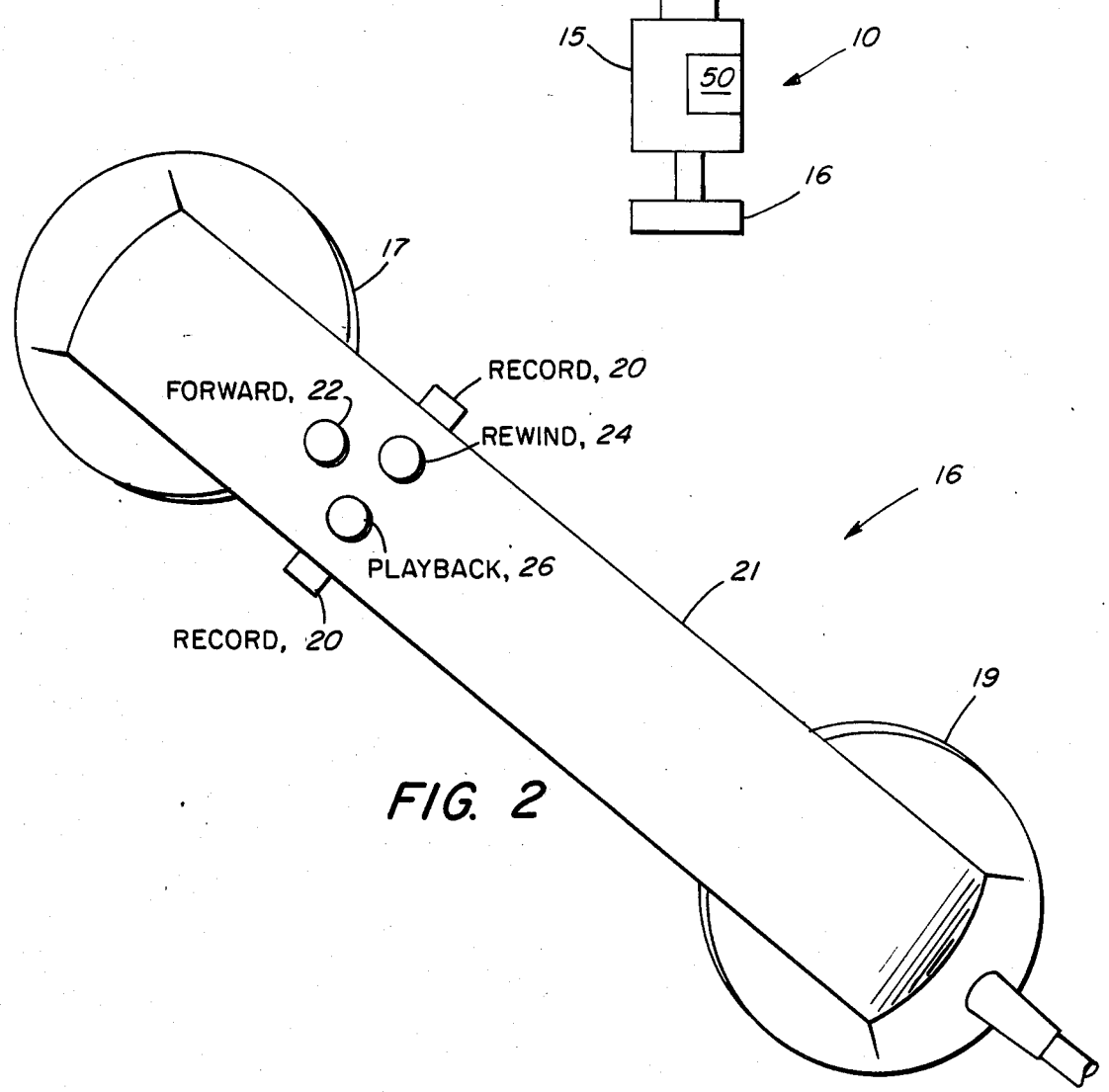
FIG. 2 shows a handset of the dictating apparatus embodying the present invention.

Referring now to the drawings, particularly FIG. 1, there is shown a plurality of remote dictating stations 10 which are interconnected with a central record/playback system 12 via telephone lines 14. Each dictating station 10 includes a telephone instrument 15 and a handset 16. Handset 16, for example a telephone style handset, includes an audio receiving section 17, an audio transmitting section 19 and a handle portion 21. Audio receiving section 17 and audio transmitting section 19 are disposed at opposite ends of handle portion 21. Handset 16 has a plurality of motion and function control key switches 18 which are mounted to handle portion 21 adjacent audio receiving section 17 within easy reach of the fingers of a user's hand holding the handset. Each motion and function control switch 18 is operative between energized and deenergized states, a switch being in the energized state when depressed and in the deenergized state when released. As shown in FIG. 2, motion and function control switches 18 include a pair of record key switches or buttons 20, the switches being located on opposite sides of handle 21 adjacent audio receiving section 17 to facilitate operation by either left or right handed operators. Motion and function control switches 18 also include a forward switch or button 22, a rewind switch or button 24 and a playback switch or button 26, the forward, rewind and playback switches being located on the back of handle portion 21 adjacent audio receiving section 17.

Figure 3:
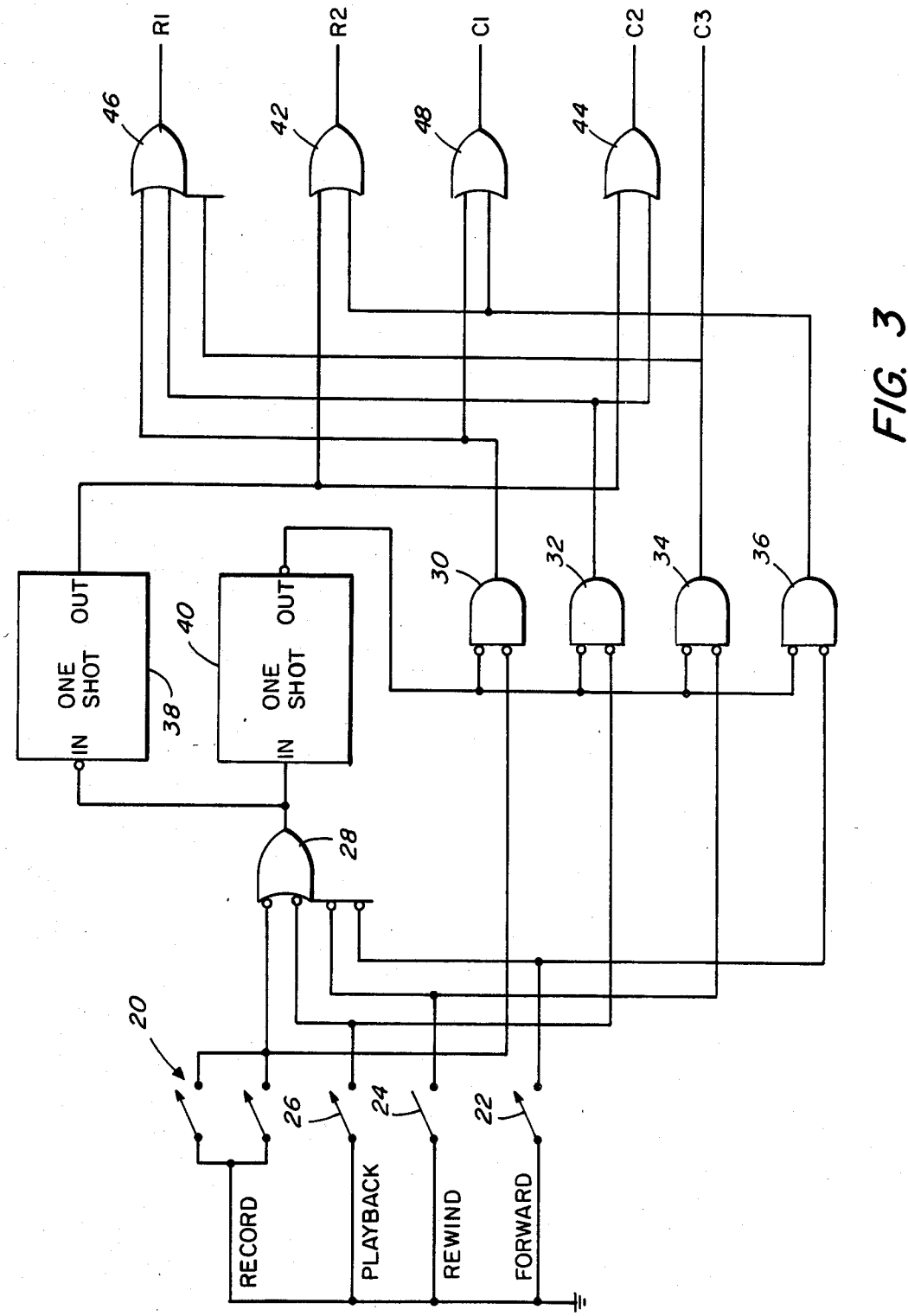
FIG. 3 is a block and schematic diagram of a circuit for controlling tone bursts generated by the handset of FIG. 2.

As shown in FIG. 3, one terminal of each of the motion and function control switches 18 is connected to ground. The other terminals of record switches 20 are connected to an input terminal or an OR gate 28 and an input terminal of an AND gate 30, the other terminal of playback switch 26 is connected to another input terminal of OR gate 28 and an input terminal of an AND gate 32, the other terminal of rewind switch 24 is connected to another input terminal of OR gate 28 and an input terminal of an AND gate 34, and the other terminal of forward switch 22 is connected to another input terminal of OR gate 28 and an input terminal of an AND gate 36. OR gate 28 is a digital logic OR gate which produces a positive voltage output whenever any of its input terminals are at ground potential. The output terminal of OR gate 28 is connected to the input terminals of ONE SHOTS 38 and 40. The output terminal of ONE SHOT 38 is connected to one input terminal of OR gates 42 and 44. The output terminal of ONE SHOT 40 is connected to an input terminal of each one of AND gates 30, 32, 34 and 36. AND gates 30, 32, 34 and 36 are digital logic AND gates, each AND gate producing a positive output voltage when both input terminals of any of the AND gates is at ground potential. ONE SHOT 38 produces a nominal sixty millisecond positive voltage output pulse whenever the potential at its input terminal changes from a positive potential to a ground potential. ONE SHOT 40 produces a nominal sixty millisecond ground pulse whenever the potential at its input terminal changes from a ground potential to a positive potential.

The output terminal of AND gate 30 is connected to an input terminal of OR gates 46 and 48. The output terminal of AND gate 32 is connected to another input terminal of OR gate 46 and another input terminal of OR gate 44. The output terminal of AND gate 34 is connected to a third input terminal of OR gate 46. The output terminal of AND gate 36 is connected to another input terminal of OR gates 42 and 48. OR gate 46 is similar to OR gate 28 with the exception that it produces a positive potential output whenever the potential at anyone of its input terminals is positive. OR gates 42, 44, and 48 are similar to OR gate 46 with the exception that they have two input terminals rather than three input terminals. OR gate 46 produces an output pulse for the period of time determined by ONE SHOT 40 whenever either record switch 20, playback switch 26 or rewind switch 24 is depressed. OR gate 42 produces an output pulse for the period of time determined by ONE SHOT 40 whenever forward switch 22 is depressed and an output pulse for the period of time determined by ONE SHOT 38 whenever any one of motion and function control switches 18 is released. Similarly, OR gate 48 produces an output pulse whenever either record switch 20 or forward switch 22 is depressed and OR gate 44 produces an output pulse when playback switch 26 is depressed or any motion and function control switch 18 is released. The output terminals of OR gates 46, 42 48, and 44 are denoted by the reference characters R1, R2, C1, and C2 respectively and the output terminal of AND gate 34 is denoted by the reference character C3. An output pulse is presented at the C3 output terminal of AND gate 34 whenever rewind switch 24 is depressed. Reference characters R1, R2, C1, C2, and C3 refer to the rows and columns of a standard dual tone multiple frequency DTMF digit keypad (not shown) which is found on telephone instrument 15. Telephone instrument 15 includes a tone generator 50 which generates selected tone signals corresponding to the keys in the keypad. The top row of digits, that is digits 1, 2 and 3, is denoted R1; the next row containing digits 4,5, and 6 is denoted R2, etc. The left-hand column containing digits 1, 4, 7, and * is denoted C1; the middle column containing digits 2, 5, 8, and 0 is denoted C2; and the last column containing digits 3, 6, 9, and # is denoted C3. The tone corresponding to digit 1 is generated by telephone instrument 15 when R1 and C1 are active, the tone corresponding to digit 5 is generated when R2 and C2 are active, and so forth. The net result is that whenever one of the motion control switches 18 is depressed, a particular tone pair unique to that switch is generated by telephone instrument 15 and transmitted to record/playback system 12 via telephone lines 14 for approximately sixty milliseconds. Also, whenever any motion control switch is released, a single tone pair representing a STOP is sent for a sixty millisecond period. The foregoing description describes the controls and circuitry located at the dictating station 10, and the circuitry at the record/playback system 12 used to process the tone signals transmitted by activating the appropriate motion control switches 18 and convert them into motion control signals for controlling a record unit 51 at the record/playback system is shown in FIG. 4.

Figure 4:
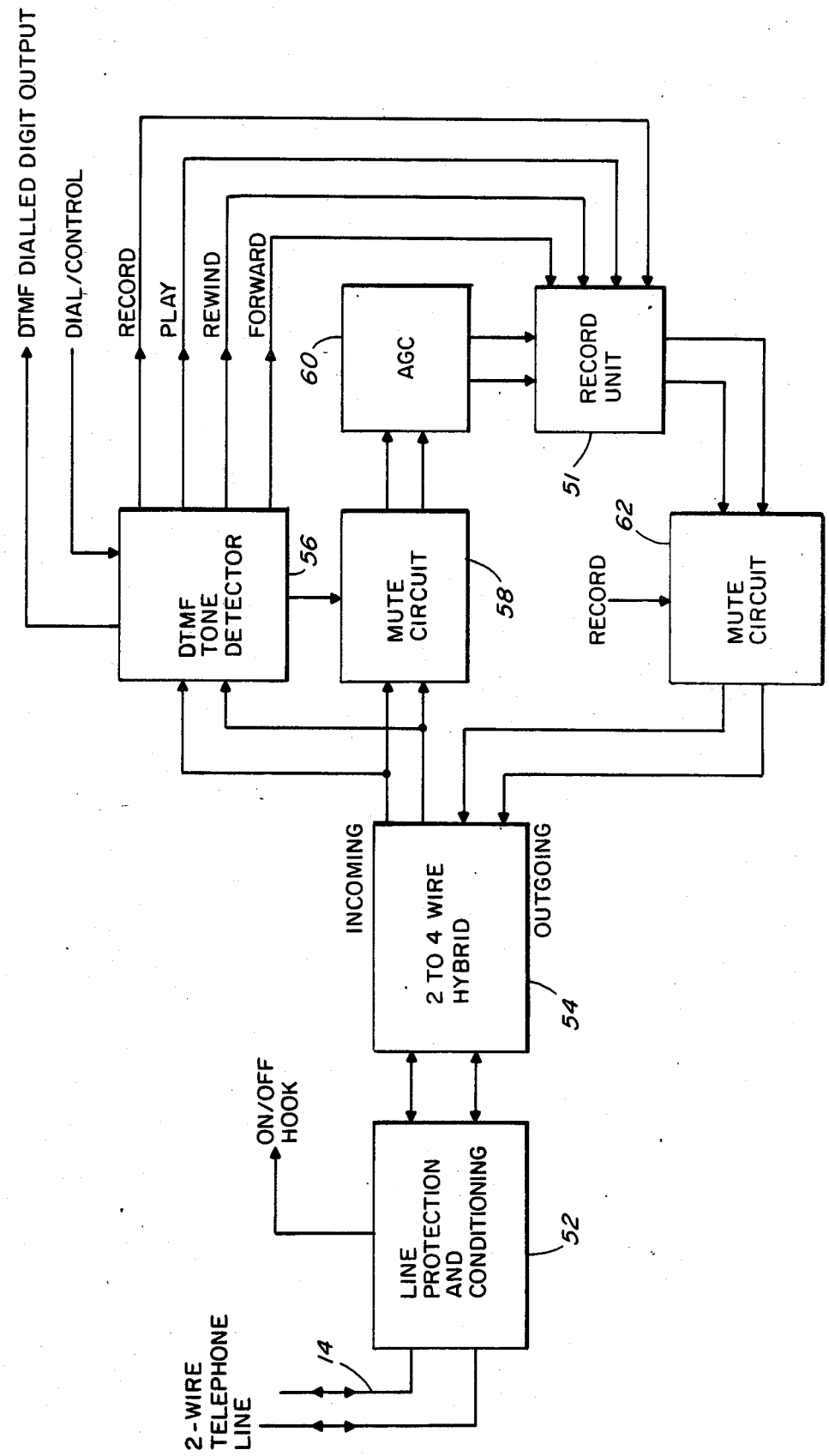
FIG. 4 is a block and schematic diagram of a receiving circuit at the record/playback system of FIG. 1.

Referring now to FIG. 4, it will be seen that the tone signals are transmitted on a telephone line 14 which is interconnected to a line protection and conditioning unit 52. Line protection and conditioning unit 52 provides FCC required protection to the telephone system and monitors telephone line 14 for a ring signal which indicates an incoming call. In addition, line protection and conditioning unit 52 provides an off-hook condition indication to the central telephone office. The signals at the output terminals of line protection and conditioning unit 52 are applied to record/playback system 12. One of the output signals of line protection and conditioning unit 52 is an ON/OFF hook signal which indicates that a user is accessing record/playback system 12. The other output signal of line protection and conditioning unit 52 is the conditioned two-wire audio signal which is applied to a 2 to 4 wire hybrid unit 54. Hybrid unit 54 is a telephone device that separates the audio signals into incoming record and outgoing playback signals. The incoming record signals ar applied to a DTMF tone detector 56 and a mute circuit 58. DTMF tone detector 56 converts the incoming record signals into control signals which correspond to either dialed digit signals or motion control signals. When a user initiates a call into record/playback system 12, a dial/control signal sets DTMF tone detector 56 to a DIAL state. The number dialed into record/playback system 12 corresponds, for example, to a selected user identification or message number. When the record/playback system 12 determines that the user has completed digit dialing, the DIAL/CONTROL signal changes to a CONTROL state and the received DTMF tones are converted into motion control signals.

The incoming signals are applied to the record circuits of record/playback system 12 via mute circuit 58 and an automatic gain control (AGC) unit 60. Record/playback system 12 is in a RECORD state when audio messages are being transmitted for recording on an audio recording media (not shown) in the record/playback system. Mute circuit 58 disables the incoming audio path from the record electronics whenever a DTMF tone signal is present. This prevents the tone from being recorded on the audio recording media used in record/playback system 12. Automatic gain control unit 60 compensates for variations in speech amplitude due to different attenuation characteristics in the telephone network or speaker tone levels.

Outgoing audio signals from record/playback system 12 are fed through a mute circuit 62 before being fed to hybrid unit 54. Mute circuit 62 interrupts the playback path whenever record/playback system 12 is in the RECORD state. This prevents undesirable feedback of the user's speech signals while recording.

Since certain changes may be made in the foregoing disclosure without departing from the scope of the invention herein involved, it is intended that all matter contained in the above description and depicted in the accompanying drawings be construed in an illustrative and not in a limiting sense. For example, although handset 16 is depicted as a telephone style handset, it is to be understood that other style handsets are used in alternative embodiments.

What is claimed is:

1. Dictating apparatus comprising:
   (a) a handset having an audio receiving section, an audio transmitting section and a handle portion, said audio receiving and audio transmitting sections disposed on opposite ends of said handle portions;
   (b) a plurality of motion and function control switches mounted to said handle portion, said motion and function control switches having energized and deenergized states;
   (c) a record/playback system communicating over telephone lines with said handset;
   (d) telephone instrument means for generating burst tone signals having predetermined durations, said telephone instrument means for generating the burst tone signals including a pair of one shots operatively connected to said motion and function control switches for generating control signals of predetermined duration in response to a change in the state of said motion and function control switches so that the duration of said burst tone signals are independent of and shorter than the duration of the states of said motion and function control switches and with said burst tone signals being transmitted over telephone lines to and activating said record/playback system in response to changes in the state of said motion and function control switches.

2. The dictating apparatus as claimed in claim 1 wherein one of said one shots generates a positive voltage pulse of predetermined duration whenever the potential at its input changes from a positive potential to a ground potential and the other of said one shots generates a ground pulse of predetermined duration whenever the potential at its input changes from a ground potential to a positive potential.

3. The dictating apparatus as claimed in claim 2 wherein said positive voltage pulse and said ground pulse are nominal sixty millisecond pulses.

4. The dictating apparatus as claimed in claim 2 wherein said telephone instrument means for generating the burst tone signal includes logic circuit means for generating a series of unique tone command signals, one of each said command signals corresponding exclusively to a change in the state of one of said motion and function control switches.

5. Multiple station dictating apparatus comprising:
   (a) a plurality of dictating stations, each station including a telephone instrument having a handset including an audio receiving section, an audio transmitting section and a handle, a plurality of motion and function control switches mounted to said handle with said motion and function control switches each having energized and deenergized states and with said plurality of motion and function control switches including a record switch, a forward switch, a playback switch and a rewind switch, said record switch being mounted on the side of said handle adjacent said audio receiving section and said forward, playback and rewind switches being mounted on the back of said handle adjacent said audio receiving section and telephone instrument means for generating burst tone signals including a pair of one shots operatively connected to said motion and function control switches for generating control signals of predetermined duration in response to a change in the state of any one of said motion and function control switches so that the duration of said burst tone signals are independent of and shorter than the duration of the states of said motion and control switches and with said burst tone signals being transmitted over telephone lines to and activating said record/playback system in response to changes in the state of said motion and function control switches; and
   (b) a record/playback system communicating with said handset via a telephone network, said record/playback system responsive to and being actuated by said burst tone signals.

6. The apparatus as claimed in claim 5 wherein one of said one shot generates a nominal sixty millisecond positive voltage pulse whenever the potential at its input changes from a positive potential to a ground potential and the other of said one shots generates a nominal sixty millisecond ground pulse whenever the potential at its input changes from a ground potential to a positive potential.

7. The apparatus as claimed in claim 6 wherein said telephone instrument means for generating burst tone signals includes logic circuit means for generating a series of unique tone command signals, one of each said tone command signals corresponding exclusively to a change in the state of one of said motion and function control switches.

8. The apparatus as claimed in claim 7 wherein said record/playback system includes a record unit and tone detector means, said record unit recording audio messages transmitted from said handset, said tone detector means responsive to said first tone signals generated by said telephone instrument means for controlling the operation of said record unit.

9. The apparatus as claimed in claim 8 wherein said record/playback system includes hybrid means through which audio signals and tone signals transmitted from said handset pass, said audio messages recorded on said record unit being transmitted to said handset via said hybrid means.

10. The apparatus as claimed in claim 9 wherein said record/playback system includes a mute circuit connected to said hybrid means and said tone detector means, said mute circuit disabling said record unit when a burst tone signal generated by said telephone instrument means is detected by said tone detector means.

* * * * *